US012603324B2

(12) United States Patent
Huang et al.

(10) Patent No.: US 12,603,324 B2
(45) Date of Patent: Apr. 14, 2026

(54) LOCALIZED HIGH SALT CONCENTRATION ELECTROLYTE

(71) Applicant: Wildcat Discovery Technologies, Inc., San Diego, CA (US)

(72) Inventors: Jinhua Huang, San Diego, CA (US); Yunguang Zhu, Santa Clara, CA (US); Bin Li, San Diego, CA (US); Gang Cheng, San Diego, CA (US); Tanghong Yi, San Diego, CA (US); Han Wang, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 19/134,130

(22) PCT Filed: Dec. 21, 2023

(86) PCT No.: PCT/US2023/085490
§ 371 (c)(1),
(2) Date: May 29, 2025

(87) PCT Pub. No.: WO2024/145182
PCT Pub. Date: Jul. 4, 2024

(65) Prior Publication Data

US 2026/0011783 A1 Jan. 8, 2026

Related U.S. Application Data

(60) Provisional application No. 63/435,658, filed on Dec. 28, 2022.

(51) Int. Cl.
*H01M 10/0568* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0025* (2013.01)

(58) Field of Classification Search
CPC ......... H01M 10/0525; H01M 10/0568; H01M 10/0569
See application file for complete search history.

(56) References Cited

U.S. PATENT DOCUMENTS 8,936,878 B2 1/2015 Morin
9,172,085 B2 10/2015 Divigalpitiya et al.
(Continued)

FOREIGN PATENT DOCUMENTS

WO 2022178271 A1 8/2022
WO WO 2022-178271 * 8/2022

OTHER PUBLICATIONS

Cao, Xia et al., "Review—Localized High-Concentration Electrolytes for Lithium Batteries," J. Electrochem. Soc. 168 010522 (13 pages).
(Continued)

*Primary Examiner* — Brittany L Raymond
(74) *Attorney, Agent, or Firm* — Young Basile Hanlon & MacFarlane, P.C.

(57) ABSTRACT

A battery includes a cathode comprising a disordered rock-salt structure and an electrolyte. The electrolyte includes a solvating solvent and a lithium salt that is soluble in the solvating solvent. The electrolyte includes a diluent that is miscible with the solvating solvent. The lithium salt is at least 5 times more soluble in the solvating solvent than in the diluent, and the solvating solvent and diluent are present in the battery at a diluent ratio/solvating solvent ratio of 0.1 to less than 3.0.

18 Claims, 6 Drawing Sheets

(51) Int. Cl.
*H01M 10/0567* (2010.01)
*H01M 10/0569* (2010.01)

(56) References Cited

U.S. PATENT DOCUMENTS

| | | | | |
|---|---|---|---|---|
| 9,276,257 | B2 | 3/2016 | Takeuchi et al. | |
| 10,367,232 | B2 | 7/2019 | Zhang et al. | |
| 11,094,966 | B2 | 8/2021 | Ren et al. | |
| 11,127,980 | B2 | 9/2021 | Zhang et al. | |
| 11,600,859 | B2 | 3/2023 | Cao et al. | |
| 11,664,536 | B2 | 5/2023 | Xu et al. | |
| 11,705,580 | B2 | 7/2023 | Cao et al. | |
| 2016/0141603 | A1 | 5/2016 | Guerfi et al. | |
| 2019/0148775 | A1* | 5/2019 | Zhang ............... | H01M 10/0567 429/331 |
| 2019/0229373 | A1* | 7/2019 | Kohyama ......... | H01M 10/0568 |
| 2022/0059816 | A1 | 2/2022 | Yi et al. | |

OTHER PUBLICATIONS

International Preliminary Report on Patentability issued in co-pending Application PCT/US2023/085490 mailed on Apr. 28, 2025 (23 pages).

International Search Report and Written Opinion issued in co-pending Application PCT/US2023/085490 mailed on Jun. 5, 2024 (10 pages).

Jiang, Gaoxue et al., "Perspective on High-Concentration Electrolytes for Lithium Metal Batteries," Small Struc. 2021, 2, 2000122 (8 pages).

OECD Guideline for the Testing of Chemicals. Partition Coefficient (n-octanol/water): Shake Flask Method, Jul. 27, 1995 (4 pages).

* cited by examiner

LOCALIZED HIGH SALT CONCENTRATION ELECTROLYTE

CROSS-REFERENCE TO RELATED APPLICATIONS

This application is a National Stage 371 entry of International Application No. PCT/US2023/085490 which was filed on Dec. 21, 2023, and published as WO2024/145182, which claims the benefit of U.S. Provisional Application 63/435,658 filed on Dec. 28, 2022. The entire contents of these applications are incorporated herein by reference in their entirety.

FIELD

This disclosure relates to a liquid localized high salt concentration electrolyte for a battery.

BACKGROUND

New batteries are utilizing cathodes with lithium metal anodes to get improved battery properties. When cycling a battery, the stripping and plating of lithium on the anode can lead to formation of high surface area lithium and lithium dendrites. This effect can lead to capacity fade in batteries. To help stabilize batteries, high salt concentration electrolytes have been formulated and demonstrated to improve cycle performance. In these types of high concentration electrolytes, all of the solvent molecules are involved in solvation of the ions from the salt resulting in no free solvent molecules. However, high salt concentration electrolytes can have high viscosity, which limits their application in batteries.

Recently to attempt remedy some of the shortcoming of high salt concentration electrolytes, a diluent solvent has been added to the high salt concentration electrolyte to form a localized high salt concentration electrolyte that has desirable viscosity while retaining some of the performance improvements of high concentration electrolytes (see, for example, U.S. Pat. Nos. 11,094,966 and 10,367,232).

In electrolytes containing diluents, lithium salts, and solvating solvents, the lithium salt can be consumed as the battery cycles which leads to a breakdown of the solvating structures. As the solvating structures breakdown, the solvating solvent is can react at the electrodes. Accordingly, what is needed are new combinations of diluents, solvating solvents, and salts that extend the number of cycles before the electrolyte begins to breakdown.

Additionally, current cathodes can lack the energy density demanded by industry needs and can have detrimental effects to the environment due to the usage of undesirable metals, like nickel and cobalt. Accordingly, what is needed are new cathodes with high energy density that are environmentally friendly and electrolytes that work with the cathodes to make batteries with high initial discharge capacity and superior capacity retention.

SUMMARY

The present disclosure provides for a battery comprising a new electrolyte formulation.

The battery may comprise an anode, a cathode, and/or a separator. In some examples, the cathode is a disordered rocksalt structure.

In one aspect, the present disclosure provides for a battery including a cathode comprising a disordered rocksalt structure and an electrolyte. The electrolyte includes solvating solvent and a lithium salt soluble in the solvating solvent. The electrolyte includes a diluent that is miscible with the solvating solvent. The lithium salt is at least 5 times more soluble in the solvating solvent than in the diluent, and the solvating solvent and the diluent are present in the battery at a diluent ratio/solvating solvent ratio of 0.1 to less than 3.0.

In some aspects, the diluent may have a miscibility point in the solvating solvent and the salt has a saturation point in the solvating solvent such that the saturation point of the salt in the solvating solvent is at least 5 times greater than the miscibility point of the diluent in the solvating solvent. The diluent and the solvating solvent may be immiscible at a molar ratio of diluent/solvating solvent of 5 or more. The diluent and the solvating solvent may be present in a molar ratio of 1.0 to 3.0. The lithium salt and the combination of the solvating solvent and the diluent may be present in a molar ratio 1:2 or more. The lithium salt may be present at a concentration of about 0.5 M or more to the saturation point in the solvating solvent or in a combination of the solvating solvent/diluent. The solvating solvent may include one or more of dialkoxy alkanes, dialkyl glycol ethers, disubstituted esters, disubstituted carbonates, trisubstituted phosphates, disubstituted sulfones, and tetrasubstituted silanes. The solvating solvent may include a disubstituted carbonate.

In another aspect, a battery includes a cathode and an electrolyte. The electrolyte may include a solvating solvent, and a lithium salt comprised of a first lithium salt and a second lithium salt that are soluble in the solvating solvent. The second lithium salt may be present in a concentration that may be less than or equal to a concentration of the first lithium salt. The electrolyte includes a diluent that is miscible at the molar concentration used in the solvating solvent to make the electrolyte. The lithium salt may be at least 5 times more soluble in the solvating solvent than in the diluent, and the solvating solvent and diluent generally are present in the battery at a diluent/solvating solvent molar ratio of 0.1 to less than 3.0.

In some aspects, the first lithium salt and the second lithium salt may be present in a molar ratio of 1 or more or 2 or more at or below their saturation point within the solvating solvent or within a combination of the solvating solvent/diluent. The solvating solvent and the diluent may be immiscible at a molar ratio of diluent/solvating solvent of 5.0 or more. The concentrations of the first lithium salt and the second lithium salt may be within about 20% of each of their phase separation (saturation point) in the electrolyte. The battery may include an anode that comprises one or more of graphite, lithium, lithium alloy, silicon, and a silicon alloy. The cathode may be charge-able to a voltage of 4.45 or more. The cathode may include a disordered rocksalt structure. The first lithium salt and second lithium salt (total salt) may be present in a molar ratio relative to the combination of the solvating solvent and diluent of about 1:2.5 to about 1:5. The first lithium salt and the second lithium salt may be present in a molar ratio of about 9:1 to about 1:1.

In some aspects, the first lithium salt or the second lithium salt may include one or more of lithium bis(oxalato)borate (LiBOB), lithium bis(pentafluoroethylsulfonyl)imide (LiBETI), lithium bis(fluorosulfonyl)imide (LiFSI), lithium tetrafluoroborate (LiBF4), lithium trifluoromethanesulfonate (LiTriflate), lithium hexafluoroarsenate (LiAsF6), lithium bis(trifluoromethanesulfonimide) (LiTFSI), and lithium hexafluoro-phosphate (LiPF6), lithium nitrate (LiNO3), LiN(SO2CF3)2, LiN(SO2F)2, LiCF3SO3, LiClO4, lithium difluoro oxalato borate anion (LiDFOB), LiI, LiBr, LiCl, LiOH, and LiSO4. The battery may have a capacity retention of 80 percent at about 100 cycles or more. The battery may have a capacity of about 180 mAh/g or more. The diluent may include a fluorinated ether that comprises one or more of 1,1,2,2-tetrafluoroethyl 2,2,3,3-tetrafluoropropyl ether; bis(2,2,2-trifluoroethyl) ether, hexafluoroisopropyl methyl ether; 1,1,2,2-tetrafluoroethyl ethyl ether; 1H,1H,5H-octafluoropentyl 1,1,2,2,-tetrafluoroethyl ether; 1,1,2,2-tetrafluoroethyl ether, 1,2-(1,1,2,2,-tetrafluorocthoxy) ethane; 1,3-(1,1,2,2-Tetrafluoroethoxy)propane (TFEP), 1,1,2,3,3,3-hexafluoro propyl 2,2,2-trifluoroethyl ether; n-butyl 1,1,2,2-tetrafluoroethyl ether; 1H,1H,2'H,3H-decafluoro dipropyl ether; 1,1,2,3,3,3-hexafluoropropyl ethyl ether; 1,1,1-trifluoro-2-[1-(2,2,2-trifluorocthoxy)ethoxy] ethane; 1H,1H,2'H-perfluorodipropyl ether, 1,1,2,2-tetrafluoroethyl isobutyl ether; 1,1,1,2,2,3,4,5,5,5-decafluro-2-methoxy-4-(trifluoromethyl)pentane; 1-(ethoxy)nonafluorobutane having a mixture of n- and iso-butyl isomers; 2-(trifluormethyl)-3-ethoxydodecafluorohexane; 3-methoxyperfluoro(2-methylpentane); heptafluoropropyl 1,2,2,2-tetrafluoroethyl ether; 1,1,2,2-tetrafluoroethyl-2,2,2-trifluoroethyl ether; methoxynonafluorobutane; ethoxynonafluorobutane; tris(2,2,2-trifluroethyl)orthoformate; and di(2,2,2-trifluroethyl) carbonate. The solvating solvent may include dialkoxy alkanes, dialkyl glycol ethers, disubstituted esters, disubstituted carbonates, trisubstituted phosphates, disubstituted sulfones, tetrasubstituted silanes, or any combination thereof.

In another aspect, the disclosure provides for a method of forming an electrolyte including dissolving a first lithium salt and a second lithium salt in a solvating solvent to form a solvating solvent-lithium salt solution, and dissolving a diluent in the solvating solvent-lithium salt solution. The method includes further dissolving more of the first lithium salt or the second lithium salt to a concentration that exceeds the amount of a lithium salt soluble in the solvating solvent present to form the electrolyte.

In some aspects, the first lithium salt and/or the second lithium salt may be present in the electrolyte below the saturation point of the salt in the electrolyte. The first lithium salt and/or the second lithium salt may have different saturation points in the solvating solvent-lithium solution and electrolyte.

In another aspect, the disclosure provides for an electrolyte comprised of a solvating solvent, a diluent, and a lithium salt comprised of a first lithium salt and a second lithium salt. The electrolyte is a solution having a saturation point. The solvating solvent also has a saturation point. The lithium salt may be at least 5 times more soluble in the solvating solvent. The first lithium salt and/or the second lithium salt may be present in an amount below their saturation point in the electrolyte and above the saturation point of the solvating solvent. The first lithium salt and/or the second lithium salt may have different saturation points in the electrolyte and the solvating solvent.

The present disclosure has discovered that the addition of a second lithium salt within the localized high salt concentration electrolyte can provide for a battery with increased capacity retention. The first lithium salt and the second lithium salt may have different anion structures and, thus, may be consumed at different rates. This may be advantageous because the composition and structure of localized high concentration electrolytes may be retained over a longer cycle life, as measured by cycle retention at 80 percent of maximum discharge capacity.

Additionally, the present disclosure has determined that the use of localized high concentration electrolytes with disordered rocksalts cathodes may provide batteries with high charge capacities and capacity retentions. Disordered rocksalt cathodes may have high energy density and may eliminate some expensive metals used in other batteries, such as nickel and cobalt. Batteries that are free of nickel and cobalt may be more desirable because they are more environmentally friendly and less expensive to produce. Accordingly, a less expensive and more environmentally friendly disordered rocksalt cathode may be used in the cathode with similar or better properties than conventional cathodes, like nickel or cobalt based cathodes.

DETAILED DESCRIPTION

Figure 1A:
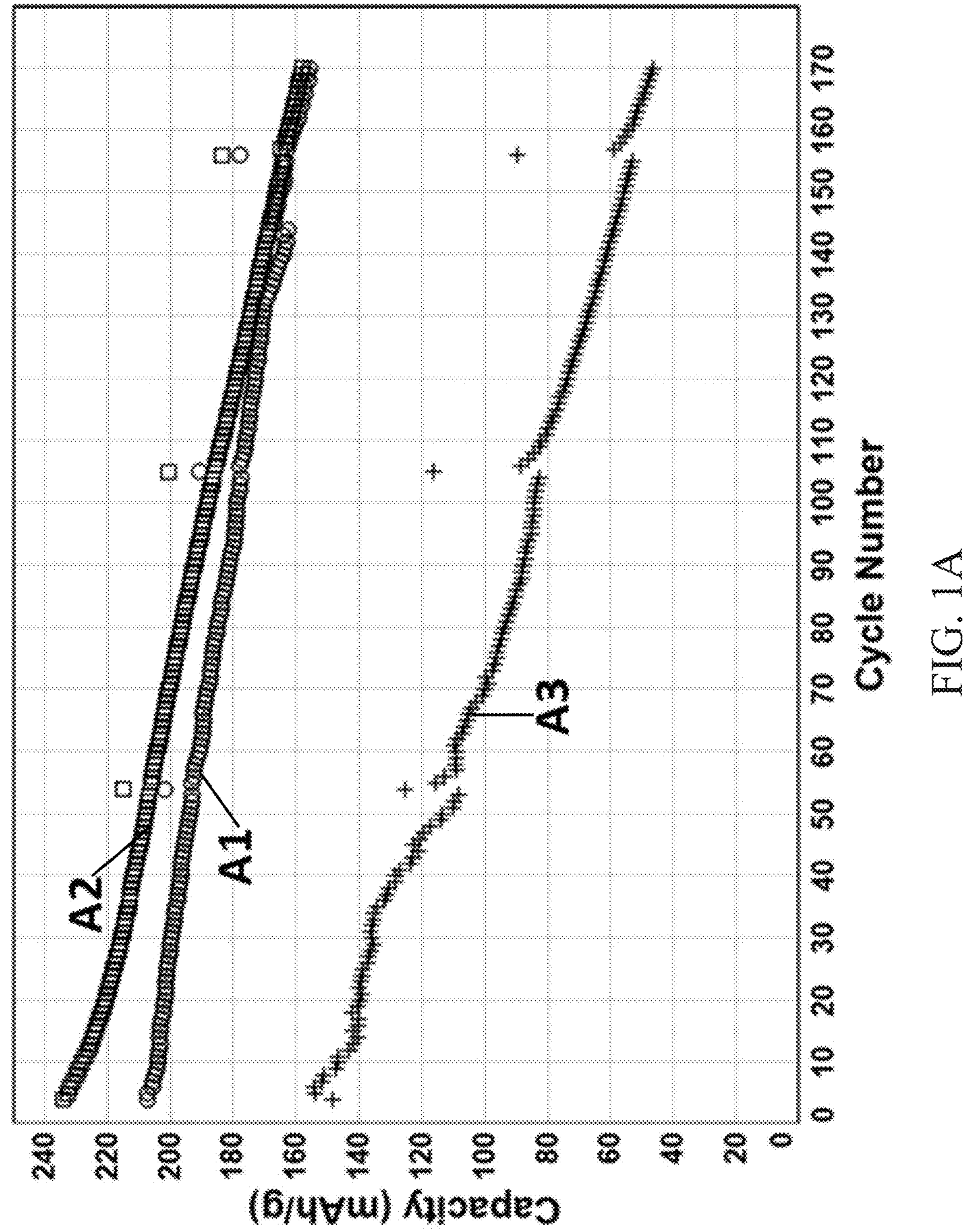
FIGS. 1A-1B illustrates the discharge capacity and capacity retention of various solvating solvents used with a disordered rocksalt cathode.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

Definitions of specific functional groups and chemical terms are described in more detail below. For purposes of this disclosure, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

The terms "halo" and "halogen" as used herein refer to an atom selected from fluorine (fluoro, —F), chlorine (chloro, —Cl), bromine (bromo, —Br), and iodine (iodo, —I). The term "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Aliphatic groups may contain 1-40 carbon atoms, 1-20 carbon atoms, 2-20 carbon atoms, 1-12 carbon atoms, 1-8 carbon atoms, 1-6 carbon atoms, 1-5 carbon atoms, 1-4 carbon atoms, 1-3 carbon atoms, or 1 or 2 carbon atoms. Exemplary aliphatic groups include, but are not limited to, linear or branched, alkyl and alkenyl groups, and hybrids thereof such as (cycloalkyl)alkyl, (cycloalkenyl)alkyl or (cycloalkyl)alkenyl. The aliphatic groups may be unsubstituted or substituted. Substituted means that one or more C or H atoms is replaced with oxygen, boron, sulfur, nitrogen, phosphorus or halogen. Typically, one to six carbon atoms may be independently replaced by the aforementioned and in particular oxygen, sulfur or nitrogen. The aliphatic group may have one or more "halo" and "halogen" atoms selected from fluorine (fluoro, —F), chlorine (chloro, —Cl), bromine (bromo, —Br), and iodine (iodo, —I).

"Phase" as used herein means one or more compounds that are physically distinct and mechanically separable from another set of compounds.

"Miscible" means two or more compounds form a solution when contacted. The compounds may be completely miscible at any molar ratio (mole/mole), but in many instances the compounds are miscible below the solubility limit of one of the compounds in the other compound with each compound typically being a liquid solvent at ambient conditions (~20° C. and ~1 atmosphere of pressure), but in some instances one or more of the compounds (e.g., solvents) may be a solid at room temperature that is dissolved in a liquid solvent at room temperature.

"Immiscible" means two or more compounds phase separate at a molar ratio (mole/mole) that is greater than the miscible molar ratio (i.e., above the solubility limit as defined by the saturation point of one of the compounds within the other compound(s)).

"Miscibility point" refers to the maximum molar ratio (mole/mole) that a compound (e.g., solvent) is miscible with another compound to form a homogenous solution just prior to phase separation analogous to the saturation point of a solid dissolved in a liquid.

"Saturation point" means the molar ratio (mole/mole) that a compound (e.g., salt) is present in a solvent, that is the maximum amount by mole of the compound that can be dissolved in the solvent before equilibrium phase separation.

A "saturated solution" contains an amount of a soluble compound that is greater than the saturation point such that an amount of the soluble compound is precipitated.

"Soluble" means that a solid compound is dissolvable in a solvent or solution of solvents at or below the saturation point for example a salt dissolved in a solution of solvents If not otherwise specified any characteristic or property may be determined by standard laboratory practices for determining such properties or characteristics. Illustratively. The boiling temperature may be determined by ASTM D86 if not generally available in the literature. "Solubility" may be determined by the 'shake flask' method based on the guidelines provided by OECD, Paris, 1981, Test Guideline 107, Decision of the Council C(81) 30 final. "Viscosity" may be determined by ATSM D445 if not generally available in the literature.

The batteries are comprised of a cathode, anode, separator and electrolyte. It is understood that each of these components may be connected or contained with other common components of a battery such as current collectors coated with the anode and cathode and battery containers encompassing the battery components with electrical connection to the battery. For example, the current collector may be any suitable metal (e.g., Al, Alloys of Al and Cu and alloys of Cu) foil, sheet or the like such as a metal foil that may be further coated with an electrical conducting material such as carbon including those described by U.S. Pat. No. 9,172,085, incorporated herein by reference.

The cathode may include any material sufficient to have desirable discharge capacity and charge retention when used with an anode and localized high concentration electrolyte. Examples of suitable cathode materials may include phosphates, fluorophosphates, fluorosulfates, fluorosilicates, spinels, lithium-rich layered oxides, and composite layered oxides. Further examples of suitable cathode materials may include spinel structure lithium metal oxides, layered structure lithium metal oxides, lithium-rich layered structured lithium metal oxides, lithium metal silicates, lithium metal phosphates, metal fluorides, metal oxides, sulfur, metal sulfides, disordered rock salt structures, or any combination thereof.

In a disordered rocksalt cathode, both lithium and a transition metal occupy a cubic close-packed lattice of octahedral sites. In electrochemical reactions, lithium diffusion proceeds by the lithium hopping from one octahedral site to another octahedral site via an intermediate tetrahedral site. Lithium in the intermediate tetrahedral site is the activated state in lithium diffusion. The activated tetrahedral lithium ion shares faces with four octahedral sites as follows: (i) the site previously occupied by the lithium ion itself; (ii) the vacancy the lithium ion will move into; and (iii & iv) two sites that can be occupied by lithium, a transition metal, or a vacancy.

The composition may be represented by $$Li_xM'_yM_zO_{2-(a+b)}F_aZ_b$$

where $1.0<x<1.75$; $0.01<y<0.55$; $0.1<z<1$; $0\leq(a+b)<0.7$; (b> or =0) M' is one of Ti, Ta, Zr, W, Nb, or Mo; M is one or more of Ti, V, Cr, Mn, Fe, Co, Ni, Cu, Zn, Al, Zr, Y, Mo, Ru, Rh and Sb; Z is one or more of P, N and S.

The amount of F and Z may be a majority or minority of the anion (i.e., O, F and one or more of P, S and N). Illustratively (a+b) is 0.05 to 1.5, 1, 0.95, 0.8, 0.65, 0.5). It may be desirable for a to be 0.05 to 0.25. Z may be any combination of P, N and S, or may be just one of them. The ratio between P, N and S when two or more are present may be any useful ratio depending on the attributes sought. For example, it may be desirable to have S present when a reduced redox potential is desired. It may also be desirable for S to be the majority of the P, S and N present in the composition.

The composition may have any desirable Li of 1 or above, but it may be desirable for Li as represented by x to be at least 1.1, 1.15, 1.2 to 1.65, 1.5 or 1.4.

The cation of the composition may be the metals described, but desirably, at least one of the metals as represented by M is comprised of one or more of Ti, Mn, Fe, Co,V, Cr, Ni and Cu. It may be desirable for M to be comprised of Ti and Mn. The composition may illustratively be one where M' is comprised of Nb. When Nb is present, it may be desirable for M to be comprised of Mn. Illustratively, M' may be Nb and M may be Mn. When Nb and Mn are present with or without other metals, they may be present in a ratio of Mn/Nb of 1 to 10, 1 to 5, 2 to 10, or 2 to 5 by mole.

The disordered rocksalts may be made by any suitable method such as those known in the art to make disordered rocksalts. Illustrative methods are described in U.S. Pat. Nos. 10,280,092, 10,978,706, and ACS Appl Mater Interfaces. 2019 Oct. 2; 11(39):35777-35787, each incorporated herein by reference.

Illustratively, the disordered rocksalts desirably is comprised of micro-sized clusters or agglomerations of sub-micro-sized particles, which may be useful to increase the capacity and energy density of a battery cathode. The micro-sized clusters are also referred to herein as secondary particles. The secondary particles desirably have average particle sizes (e.g., diameters) in the micrometer scale, such as between 1 micrometer and 20 micrometers. The sub-micro-sized particles cluster to form the secondary particles. The sub-micro-sized particles are also referred to herein as primary particles. The terms "primary" and "secondary" indicate that the primary particles are formed before the secondary particles, and the secondary particles are agglomerations of the primary particles. The primary particles have average particle sizes (e.g., diameters) in the nanometer scale, such as less than 400 nanometers. The sub-micro primary particles of disordered rocksalt material may provide desirable conductivity and the micro-sized secondary particles of the disordered rocksalt material yield high electrode energy density.

The cathode of the battery may alternatively be comprised of any suitable lithium metal phosphate such as those known in the art. Exemplary lithium metal phosphates include those comprised of manganese, iron or combination thereof. The lithium metal phosphate may be doped with small amounts (5% by weight or less) of other metals The cathode may further include other cathode components such as binders and electrical conducting additives. The binder may be any suitable such as those known in the art and may include, for example, carboxy methyl cellulose (CMC), styrene-butadiene rubber (SBR), polyvinylidene fluoride (PVDF), poly-tetrafluoroethylene (PTFE), or a mixture of two or more thereof. Desirably, the cathode is comprised of PVDF. The electrically conducting additive may such as graphite, carbon black, carbon nanotubes, graphene and carbon fiber.

The amount of other cathode components may be any suitable amount, but generally is at most about 20% or 10% by volume to about 0.1%, 0.5% or 1% by volume of the cathode (i.e., lithium metal phosphate and other cathode components).

The anode may include any material sufficient to function as an anode with the selected cathode and localized high concentration electrolyte. The anode may include one or more of graphite, lithium, lithium alloy, silicon, and a silicon alloy. Where the anode is a lithium alloy or lithium metal, the electrolyte may be formulated such that formation of additional lithium surface arca or lithium dendrites is reduced as the battery is cycled. Examples of suitable anode materials may include conventional anode materials used in lithium ion batteries, such as lithium, graphite ("$Li_xC_6$"), and other carbon, silicon, or oxide-based anode materials.

The anode may be comprised of graphitic carbon. Graphitic carbon may be any carbon capable of intercalating lithium with it being understood that carbons exhibiting short range order, but limited long range order that appear amorphous by X-ray diffraction may be used. The graphitic carbon, illustratively, may be synthetic or natural graphite having sufficient purity for use in lithium ion batteries, which typically requires a purity of at least about 99.5%, 99.9 or 99.95%. Illustratively, the graphitic carbon may be a spherical graphite, with it being understood that such graphite is not perfectly spherical but may be ovoid in nature, but are not flakes. The spherical graphite, generally, has a high purity such as at least 99.95% pure, but may also be comprised of a small amount of oxides such as silica, titania and zirconia or other materials capable of intercalating lithium but these are present in an amount of less than 5% or 1% by volume of the cathode. The spherical graphite may be from artificial graphite or purified natural graphite. Examples of useful spherical graphite are described in U.S. Pat. Pub. 2016/0141603 and U.S. Pat. No. 9,276,257, each incorporated herein by reference. Examples of suitable commercially available spherical graphite include those available from Syrah Resources, Magnis Resources, Northern Graphite, Focus Graphite and Graphite One.

The separator may have one or more layers that may be bonded together. Examples of suitable separators includes a poly-imide, polyolefin (such as polypropylene), polyethylene terephthalate, ceramic-coated polyolefin, cellulose, or a mixture of two or more thereof. Such materials may be in the form of microfibers or nanofibers. The separator may include a combination of microfibers and nanofibers. In certain embodiments, the separator includes polyethylene terephthalate microfibers and cellulose nanofibers. Illustrations of separators that may be useful include those described in U.S. Pat. No. 8,936,878, incorporated herein by reference. Further examples of separators include those available from Dreamweaver International (Greer S.C). Typically, the separator is at most 250 micrometers thick to at least about 5 or 10 micrometers thick.

The electrolyte includes a diluent, a solvating solvent, and a lithium salt. The diluent and solvating solvent may be contacted in a miscible molar ratio, which is described below.

The lithium salt may be any salt sufficient to be surrounded by the solvating structures of the solvating solvent and/or diluent in the electrolyte. The lithium salt may have a solubility in the solvating solvent relative to a solubility in the diluent that allows for the diluent and solvating solvent to be miscible at a miscible molar ratio that has improved discharge capacity and capacity retention. For example, the lithium salt may have a solubility in the diluent above zero. The lithium salt may have a solubility in the solvating solvent of about 1 M or more, about 3 M or more, or about 5 M or more. The lithium salt may have a solubility in the solvating solvent of about 20 M or less, about 15 M or less, or about 10 M or less. The lithium salt may be about 3 times to about 20 times, about 3 times to about 15 times, about 3 times to about 10 times, about 5 times to about 20 times, about 5 times to about 15 times, about 5 times to about 10 times, about 10 times to about 20 times, or about 10 times to about 15 times more soluble in the solvating solvent than a solubility of the diluent in the solvating solvent. The lithium salt may be saturated in the combination of the solvating solvent and the diluent at about 1 M or more, about 2 M or more, or about 5 M or more relative to the concentration of the lithium salt in the solvating solvent alone. The lithium salt may be saturated in the combination of the solvating solvent and the diluent at about 20 M or less, about 10 M or less, or about 7 M or less relative to the concentration of the lithium salt in the solvating solvent alone.

The concentration at which the lithium salt reaches the saturation point in the electrolyte may change depending on the miscible molar ratio of the diluent/solvating. For example, the lithium salt may be present in the electrolyte at a concentration of about 0.1 M or more, about 0.5 M or more, or about 1.0 M or more. The lithium salt may be present in the electrolyte at a concentration of about 3.5 M or less, about 2.0 M or less, or about 1.5 M or less. The lithium salt and combination of diluent/solvating solvent may be present in the electrolyte at a molar ratio of about 1:2 or more, 1:2.6 or more, or 1:3.2 or more. The lithium salt and combination of diluent/solvating solvent may be present in the electrolyte a molar ratio of about 1:6 or less, about 1:5 or less, or about 1:4 or less.

The electrolyte may include any number of lithium salts that in combination are dissolvable in a miscible molar ratio of diluent/solvating solvent. The electrolyte may include a single salt, or the electrolyte may include two or more, three or more, four or more, or a plurality of salts. When using a combination of lithium salts, the lithium salts may each have a different saturation point in the solvating solvent, diluent, or combination of both in the electrolyte solution. For example, a first lithium salt may have saturation point within the solvating solvent, diluent, or combination of both in the electrolyte solution that is between about 1%, 5% or 10% to about 50%, 35%, or 20% higher or lower than the second lithium salt's saturation point in the same.

When using a combination of lithium salts, the lithium salts may each be different from each other. It has been discovered that the use of different salts may cause consumption by the anode, cathode, or solid electrolyte interphase (SEI) layer at different rates, which may be aided by having differing saturation points in the solvating solvent, diluent or combination thereof. When two or more lithium salts are used, one lithium salt may replace another lithium salt in the solvating structures as the battery cycles and lithium salt is consumed so that the solvating structures are retained and the electrolyte remains stable. Desirably, for example, a combination of salts, such as LiFSI and $LiBF_4$, has been found to have improved capacity retention of a battery comprised of a high energy density cathode, such as one comprised of a disordered rocksalt.

The lithium salt may include lithium bis(oxalato)borate (LiBOB), lithium bis(pentafluoroethylsulfonyl)imide (LiBETI), lithium bis(fluorosulfonyl)imide (LiFSI), lithium tetrafluoroborate ($LiBF_4$), lithium trifluoromethanesulfonate (LiTriflate), lithium hexafluoroarsenate ($LiAsF_6$), lithium bis(trifluoromethanesulfonimide) (LiTFSI), and lithium hexafluoro-phosphate ($LiPF_6$), lithium nitrate ($LiNO_3$), $LiN(SO_2CF_3)_2$, $LiN(SO_2F)_2$, $LiCF_3SO_3$, $LiClO_4$, lithium difluoro oxalato borate anion (LiDFOB), LiI, LiBr, LiCl, LiOH, $LiSO_4$, or any combination thereof.

In some examples, another salt may be included in the electrolyte, such as another alkali metal salt, an alkaline earth metal salt, or any combination thereof. For example, the lithium salt may include a sodium salt, a magnesium salt, a mixture of lithium and sodium salts, a mixture of lithium and magnesium salts, a mixture of lithium, magnesium, and sodium salts, a mixture of sodium and magnesium salts, or any combination thereof. For example, the lithium salt may include sodium bis(fluorosulfonyl)imide (NaFSI), sodium bis(trifluoromethylsulfonyl)imide (NaTFSI), sodium bis(oxalato)borate (NaBOB), NaFSI, NaTFSI, any lithium salt, or any combination thereof.

The diluent and solvating solvent may be contacted in the electrolyte at a molar ratio that is miscible. An amount of diluent may be used such that the diluent and solvating solvent are miscible when the lithium salt is dissolved in the solvating solvent. For example, in the presence of the lithium salt the diluent and the solvating solvent may become immiscible at a molar ratio of diluent/solvating solvent of about 0.5 or more, about 1.5 or more, about 2.0 or more, 2.5 or more, about 3.5 or more, or about 5.0 or more to essentially completely miscible, about 20 or less, or about 10 or less.

The diluent may function to lower the viscosity of the electrolyte while retaining the desired high salt concentration attributes useful for a battery. For example, when diluent is added to a solution of solvating solvent and lithium salt, the viscosity of the solution may be lowered and advantageous attributes retained or realized. The viscosity of the diluent is desirably less than the solvating solvent, and desirably is at least 5%, 10%, 25% or 50% less than the viscosity of the solvating solvent. The viscosity of the solution may be any amount sufficient to form an electrolyte with desirable discharge capacity and/or capacity retention. For example, the viscosity of the solution may be about 0.1 cP or more, about 3 cP or more, or about 5 cP or more. The viscosity of the solution may be about 15 cP or less, about 10 cP or less, or about 7 cP or less.

The diluent may have any level of miscibility with the solvating solvent sufficient to be used in a localized high concentration electrolyte. For example, the diluent may be completely miscible or may have a miscibility point in the solvating solvent of at most 10 (moles diluent/moles solvating solvent), about 5,or about 3 to at least about 0.5 or about 1. It has been surprisingly discovered that diluents that have limited miscibility in a solvating solvent may realize improved discharge capacity and capacity retention in some instances when the diluent is used at a molar ratio below but within 50%, 25% or 10% of the miscibility point of the diluent in the solvating solvent. As an illustration, the diluent may have a miscibility point between about 2 and about 5 molar ratio, or between about 2 and about 3 molar ratio, and the molar ratio of the diluent and solvent in the electrolyte is at or within 50%, 25% or 10% of the miscibility point of the diluent in the solvating solvent. Relative to the saturation point of the lithium salt in the solvating solvent, the miscibility point of the diluent in the solvating solvent may be about 3 times to about 15 times less, about 3 times to about 10 times less, about 3 times to about 8 times less, about 5 times to about 15 times less, about 5 times to about 10 times less, or about 5 times to about 8 times less than the saturation point of the lithium salt in the solvating solvent.

The miscibility of the diluent in the solvating solvent may change based on the presence of lithium salt that is dissolved in the solvating solvent. For example, the diluent may have a higher or lower miscibility with the solvating solvent in the presence of lithium salt, which may be at or below the saturation point in the solvating solvent or solution. The diluent may have a miscibility in the solvating solvent having salt dissolved therein that is from 1% to 20%, 10% or 5% of the miscibility point of the diluent in neat solvating solvent, with it being desirable for the diluent to have a higher miscibility in the presence of the salt in the solvating solvent.

The diluent may have a miscibility in the solvating solvent that is different than the solubility of the lithium salt in the solvating solvent. For example, the lithium salt may be between about 3 times, about 5 times, or about 7 times to about 10 times, about 13 times or about 15 times more soluble by mole in the solvating solvent than the miscibility of the diluent in the solvating solvent. As an illustration, it may be desirable for the diluent to have a miscibility point of 2 or 3 to 5 molar ratio, and the amount of diluent present is within 10%, 25% or 50% of the miscibility point and the amount of salt that can be dissolved in the diluent is 5 to 10 times less, 5 to 9 times less, 5 to 8 times less, 6 to 10 times less, 6 to 9 times less, or 6 to 8 times less than the amount of salt that can be dissolved in the solvating solvent.

The structure of the diluent may alter the miscibility of the solvating solvent and the diluent. For example, a diluent with a linear alkyl group on the diluent may have a different miscibility in the solvating solvent compared to a miscibility of a diluent with a branched alkyl group. For example, a solvating solvent may be immiscible with diluent at a lower molar ratio when a branched alkyl group is present in the diluent, compared to when only linear alkyl groups are contained in the diluent, while still achieving desirable discharge capacity and capacity retention.

The electrolyte may include a combination of diluents with different substitutions. For examples, a combination of diluents containing linear alkyl groups, branched alkyl groups, or both may provide for a different miscible molar ratio with the solvating solvent while achieving desirable discharge capacity and capacity retention.

The electrolyte may include any number of different diluents sufficient to be miscible with the solvating solvent and/or adjust the viscosity of the electrolyte. For example, the electrolyte may include one or more, two or more, three or more, four or more, or a plurality of diluents.

The diluent may include one or more fluorinated ethers. The fluorinated ethers may be any compound that includes a combination of ether groups, fluorine atoms, and carbon atoms that are fully saturated with hydrogen.

Examples of fluorinated ethers may include one or more of 1,1,2,2-tetrafluoroethyl 2,2,3,3-tetrafluoropropyl ether (TTE); bis(2,2,2-trifluoroethyl) ether (BTFE), hexafluoroisopropyl methyl ether (HFPME); 1,1,2,2-tetrafluoroethyl ethyl ether (TFEEE); 1H,1H,5H-octafluoropentyl 1,1,2,2,-tetrafluoroethyl ether (OFPTFEE); 1,1,2,2-tetrafluoroethyl ether, 1,2-(1,1,2,2,-tetrafluoroethoxy) ethane (TFEE); 1,3-(1,1,2,2-Tetrafluoroethoxy)propane (TFEP), 1,1,2,3,3,3-hexafluoro propyl 2,2,2-trifluoroethyl ether (HFPTFEE); n-butyl 1,1,2,2-tetrafluoroethyl ether (BTFEE); 1H,1H,2'H,3H-decafluoro dipropyl ether (DFDPE); 1,1,2,3,3,3-hexafluoropropyl ethyl ether (HFPEE); 1,1,1-trifluoro-2-[1-(2,2,2-trifluoroethoxy)ethoxy] ethane (TTFEEE); 1H,1H,2'H-perfluorodipropyl ether (PFDPE); 1,1,2,2-tetrafluoroethyl isobutyl ether (TFEBE); 1,1,1,2,2,3,4,5,5,5-decafluro-2-methoxy-4-(trifluoromethyl)pentane; 1-(ethoxy)nonafluorobutane having a mixture of n- and iso-butyl isomers; 2-(trifluoromethyl)-3-ethoxydodecafluorohexane; 3-methoxyperfluoro(2-methylpentane); heptafluoropropyl 1,2,2,2-tetrafluoroethyl ether; 1,1,2,2-tetrafluoroethyl-2,2,2-trifluoroethyl ether (TFTFE); methoxynonafluorobutane (MOFB); ethoxynonafluorobutane (EOFB); tris(2,2,2-trifluroethyl)orthoformate; and di(2,2,2-trifluroethyl) carbonate.

The solvating solvent may function to provide solvating structures around the anion and/or cation of the lithium salt. To realize the desirable amount of salt dissolution in the electrolyte, in which some of the salt may be dissolved in the diluent, which may realize improved battery performance, the lithium salt may first be dissolved in the solvating solvent at or near the saturation point to form a solvating solvent-salt solution. The diluent may then be added to the solvating solvent-salt solution to form the electrolyte. Further salt may be added until at or near the saturation point of the salt in the electrolyte.

Since some of the lithium salt is soluble in the diluent, after the diluent is added to the solution of the solvating solvent and the lithium salt, an additional amount of lithium salt may be added up to or below the saturation point of the solution. Illustratively, the amount of salt may be at any useful concentration, but generally is essentially at or just below the saturation point, but may be adjusted depending, for example, the operating conditions expected for any particular battery (e.g., the amount of salt may be within 20%, 10% or 5% of the saturation point of the solvating solvent-diluent solution at ambient conditions). Additional lithium salt may be added to the combination of the diluent and the solvating solvent up to the saturation point of the solvating solvent, while the diluent and the solvating solvent are in a miscible molar ratio as described above. The amount of the salt in the solvating solvent-diluent solution may exceed the saturation point of the solvating solvent alone. For example, the amount of salt in solution may exceed the saturation point of the solvating solvent alone by between about 1 percent to about 25 percent, about 1 percent to about 10 percent, about 5 percent to about 25 percent, or about 5 percent to about 10 percent, based on the saturation point of the lithium salt in the solvating solvent alone. An amount of lithium salt below saturation of the solvating solvent-diluent solution may be desired when considering viscosity parameters or battery performance.

In some examples, the diluent and solvating solvent may be contacted first, and then the lithium salt may be contacted with the combination of the diluent and solvating solvent in an amount up to or below the saturation point of the combined diluent and solvating solvent. If the lithium salt is contacted with the solvating solvent, the diluent, or both in an amount above the saturation point of the solvating solvent, the diluent, or both, so that a saturated solution is formed, precipitated lithium salt may be removed from the saturated solution. If the lithium salt is contacted with the solvating solvent, in an amount above the saturation point of the solvating solvent, precipitated lithium salt may be removed before or after the addition of the diluent.

The solvating solvent has a solubility with the lithium salt that is different than the solubility of the lithium salt in the diluent. The solubility of the lithium salt in the diluent and the solvating solvent may affect the miscible molar ratio of the diluent/solvating solvent, when the lithium salt is present at or below the saturation point. For example, the miscible molar ratio of the diluent/solvating solvent may be higher or lower when the lithium salt is present at the saturation point in the solution of solvating solvent and diluent, compared when the lithium salt is absent.

The solvating solvent may be included based on the lithium salt being present at or below the saturation point so that the lithium salts may immobilize the solvating solvent and reduce its ability to form the SEI layer. The diluent and solvating solvent may be contacted at, above, or below a miscible molar ratio. The diluent and the solvating solvent may be contacted at or below the miscible molar ratio to provide superior discharge capacity and/or capacity retention. In some examples, when the solvating solvent, diluent, and lithium salt are contacted, the lithium salt may be present in a concentration that is at or below the saturation point in a miscible molar ratio of the diluent/solvating solvent in order to improve the discharge capacity and/or capacity retention of the battery.

The solvating solvent may have a saturation point of the salt that is any practicable to make the electrolyte. The saturation point of the salt in the solvating solvent may be a molar ratio of at least 1, about 2 or about 3 to about 10 or about 20. The viscosity of the solvating solvent may be any viscosity useful for making a battery. The viscosity of the solvating solvent at room temperature (~20° C.) may be 1 or more cP, 20 or more cP or 50 or more cP to 200 or less cP, 100 or less cP or 200 or less cP. Note, in some instances the solvating solvent may be a solid at room temperature. In such instances, solubilization of the salt results in the solvent becoming liquid due to freezing point depression.

The solvating solvent may be any solvent or combination of solvents that are sufficiently miscible with the diluent and can sufficiently dissolve the lithium salt with or without the presence of the diluent. The electrolyte may include any number of solvating solvents sufficient to form desirable solvation around cation and/or anion of the lithium salt. For example, the electrolyte may include one or more, two or more, three or more, four or more, or a plurality of solvating solvents. The solubility of each salt in the solvating solvent and/or diluent may be essentially the same and or different. It may be desirable, for example, to have one salt that has a greater solubility (e.g., 5%, 10% or 20% more soluble than the other salts) in the diluent, which may be desirable in forming an advantageous SEI layer. In some examples, the solvating solvent may include one or more of dialkoxy alkanes, dialkyl glycol ethers, disubstituted esters, disubstituted carbonates, trisubstituted phosphates, disubstituted sulfones, and tetrasubstituted silanes.

Dialkoxy alkanes may include a pair of alkyl ethers bound by a $C_{1-12}$ alkane group that may be branched or linear. For example, dialkoxy alkanes may include one or more of dimethoxy ethane (DME), diethoxy ethane (DEE), 1,2-dimethoxypropane (DMP), The dialkoxy alkane may have the following structure:

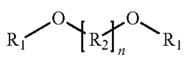

where each $R_1$ may independently comprise a $C_{1-12}$ alkyl group that may be linear or branched, or any combination thereof.
where $R_2$ may comprise a $C_{1-12}$ alkyl group that may be linear or branched, or any combination thereof.
where n is an integer between 1 and 5.

Dialkyl glycol ethers may include a series of three either groups separated by alkyl chains that may be linear or branched. Example of dialkyl glycol eithers may include 1,2-diethylene glycol isopropyl methyl ether (DEGIM), diethylene glycol butyl methyl ether (DEGBM), or any combination thereof. The dialkyl glycol may have the following structure:

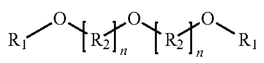

where each $R_1$ may independently comprise a $C_{1-12}$ alkyl group that may be linear or branched, or any combination thereof.
where each $R_2$ may independently comprise a $C_{1-12}$ alkyl group that may be linear or branched, or any combination thereof.
where each n is an integer between 1 and 5.

Disubstituted esters may include an ester that is substituted at the carbon atom of the carbonyl or the oxygen atom of the hydroxyl group by one or more groups including hydrogen, $C_{1-12}$ alkyl, $C_{1-12}$ aryl, or any combination thereof. Examples of disubstituted esters may include ethyl difluoroacetate, ethyl propionate, or any combination thereof. The disubstituted ester may have the following structure:

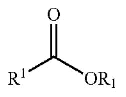

where each $R_1$ may independently comprise a hydrogen atom, a $C_{1-12}$ alkyl group that may be linear or branched, a hetero-alkyl group that may be linear or branched, or any combination thereof. Both $R_1$ in combination may form a cyclic alkyl ring that may optionally include one or more hetero atoms.

Disubstituted carbonates may be substituted independently at each of the carbon atoms. Disubstituted carbonates may include dimethyl carbonate, diethyl carbonate, ethyl methyl carbonate, fluoroethylene carbonate, or any combination thereof. The disubstituted carbonate may have the following structure:

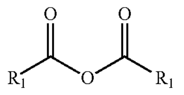

where each $R_1$ may independently comprise a hydrogen atom, a $C_{1-12}$ alkyl group that may be linear or branched, a hetero-alkyl group that may be linear or branched, or any combination thereof. Both $R_1$ in combination may form a cyclic alkyl ring that may optionally include one or more hetero atoms.

Trisubstituted phosphates may be substituted at each of the single bonded oxygen atoms. Trisubstituted phosphates may include trimethyl phosphate, triethyl phosphate, or any combination thereof. The trisubstituted phosphates may have the following structure:

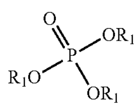

where each $R_1$ may independently comprise a hydrogen atom, a $C_{1-12}$ alkyl group that may be linear or branched, a hetero atom, a hetero-alkyl group, or any combination thereof.

where each $R_2$ may independently comprise a hydrogen atom, $C_{1-12}$ alkyl group that may be linear or branched, or any combination thereof.

Disubstituted sulfones may be substituted at the sulfur atom by one or more groups including hydrogen, $C_{1-12}$ alkyl, $C_{1-12}$ aryl, or any combination thereof. Disubstituted sulfones may include sulfolane, methyl ethyl sulfone, methyl isopropyl sulfone, or any combination thereof. The disubstituted sulfones may have the following structure:

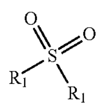

where each $R_1$ may independently comprise a hydrogen atom, a $C_{1-12}$ alkyl group that may be linear or branched, a hetero-alkyl group that may be linear or branched, or any combination thereof. Both $R_1$ in combination may form a cyclic alkyl ring that may optionally include one or more hetero atoms.

Tetrasubstituted silanes may be substituted at the silicon atom and/or each oxygen atom. Tetrasubstituted silanes may include triethyoxymethyl silane, trimethoxymethylsilane, or any combination thereof. The tetrasubstituted silanes may have the following structure:

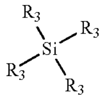

where each $R_3$ may independently comprise a hydrogen atom, a $C_{1-12}$ alkyl group that may be linear or branched, a hetero atom, a hetero-alkyl group, $C_{1-12}$ alkoxy group that may be linear or branched, a hetero atom, a hetero-alkyl group, or any combination thereof.

The battery may have a discharge capacity or capacity retention that is at least partially dependent on the molar ratios of the solvents and the diluents and solvating solvents selected. For example, a structure of the diluent that includes branched or linear alkyl groups may change the discharge capacity or capacity retention. In other examples, lowering or raising the molar ratio of the diluent/solvating solvent based on miscibility of the solvents or structural considerations of the diluent may alter the discharge capacity or capacity retention. The battery may have a discharge capacity of about 120 mAh/g or more, about 140 mAh/g or more, or about 160 mAh/g or more. The battery may have a discharge capacity of about 220 mAh/g or less, about 200 mAh/g or less, or about 180 mAh/g or less. The battery may have a capacity retention at 80 percent of about 40 cycles or more, about 90 cycles or more, or about 140 cycles or more. The battery may have a capacity retention at 80 percent of about 200 cycles or less, about 180 cycles or less, or about 160 cycles or less.

Enumerated Embodiments

The following embodiments are intended to be illustrative and do not unduly limit the scope of the disclosure.

Embodiment 1. A battery, comprising:

a cathode comprising a disordered rocksalt structure; and an electrolyte, comprising:

- a solvating solvent;
- a lithium salt soluble in the solvating solvent; and
- a diluent that is miscible with the solvating solvent,
- the lithium salt being at least 5 times more soluble in the solvating solvent than in the diluent, and the solvating solvent and diluent being present in the battery at a diluent ratio/solvating solvent ratio of 0.1 to less than 3.0.

Embodiment 2. The battery of embodiment 1, wherein the diluent has a miscibility point in the solvating solvent and the salt has a saturation point in the solvating solvent such that the saturation point is at least 5 times greater than the miscibility point.

Embodiment 3. The battery of embodiments 1 or 2, wherein the diluent and the solvating solvent are immiscible at a molar ratio of diluent/solvating solvent of 5 or more.

Embodiment 4. The battery of any one of embodiments 1 to 3, wherein the diluent and the solvating solvent are present in a molar ratio of 1.0 to 3.0.

Embodiment 5. The battery of any one of embodiments 1 to 4, wherein the lithium salt and the combination of the solvating solvent and the diluent are present in a molar ratio 1:2 or more.

Embodiment 6. The battery of any one of embodiments 1 to 5, wherein the lithium salt is present at a concentration of about 0.5 M or more, at a saturation point within the solvating solvent or within a combination of the solvating solvent/diluent.

Embodiment 7. The battery of any one of embodiments 1 to 6, wherein the solvating solvent comprises one or more of dialkoxy alkanes, dialkyl glycol ethers, disubstituted esters, disubstituted carbonates, trisubstituted phosphates, disubstituted sulfones, and tetrasubstituted silanes.

Embodiment 8. The battery of any one of embodiments 1 to 7, wherein the solvating solvent comprises a disubstituted carbonate.

Embodiment 9. A battery, comprising:

a cathode; and an electrolyte, comprising:

- a solvating solvent;
- a lithium salt comprising a first lithium salt and a second lithium salt soluble in the solvating solvent, the second salt being present in a concentration that is less than or equal to a concentration of the first salt;
- a diluent that is miscible in the solvating solvent,
- the lithium salt being at least 5 times more soluble in the solvating solvent than in the diluent, and the solvating solvent and diluent being present in the battery at a diluent ratio/solvating solvent ratio of 0.1 to less than 3.0.

Embodiment 10. The battery of embodiment 9, wherein the first lithium salt and the second lithium salt are present in a molar ratio of 1 or more, at or below a saturation point within the solvating solvent or within a combination of the solvating solvent/diluent.

Embodiment 11. The battery of embodiment 10, wherein the first lithium salt and the second lithium salt are present in a molar ratio of 2 or more, at or below the saturation point within the solvating solvent or within a combination of the solvating solvent/diluent.

Embodiment 12. The battery of any one of the preceding embodiments, wherein the solvating solvent and the diluent are immiscible at a molar ratio of diluent/solvating solvent of 5.0 or more.

Embodiment 13. The battery of embodiment 10, wherein concentrations of the first lithium salt and the second lithium salt are within about 20% of phase separation in the electrolyte.

Embodiment 14. The battery of any one of the preceding embodiments, further comprising an anode that comprises one or more of graphite, lithium, lithium alloy, silicon, and a silicon alloy.

Embodiment 15. The battery of any one of embodiments 9 to 14, wherein the cathode is charge-able to a voltage of 4.45 or more.

Embodiment 16. The battery of any one of claims 9 to 15, wherein the cathode comprises a disordered rocksalt structure.

Embodiment 17. The battery of any one of embodiments 9 to 16, wherein the first lithium salt and the second lithium salt are present in a molar ratio relative to the combination of the solvating solvent and diluent of about 1:2.5 to about 1:5.

Embodiment 18. The battery of any one of embodiments 9 to 17, wherein the first lithium salt and the second lithium salt are present in a molar ratio of about 9:1 to about 1:1.

Embodiment 19. The battery of any one of embodiments 9 to 18, wherein the first lithium salt comprises lithium bis(oxalato)borate (LiBOB), lithium bis(pentafluoroethylsulfonyl)imide (Li-BETI), lithium bis(fluorosulfonyl)imide (LiFSI), lithium tetrafluoroborate ($LiBF_4$), lithium trifluoromethanesulfonate (LiTriflate), lithium hexafluoroarsenate ($LiAsF_6$), lithium bis(trifluoromethanesulfonimide) (LiTFSI), and lithium hexafluoro-phosphate ($LiPF_6$), lithium nitrate ($LiNO_3$), $LiN(SO_2CF_3)_2$, $LiN(SO_2F)_2$, $LiCF_3SO_3$, $LiClO_4$, lithium difluoro oxalato borate anion (LiDFOB), LiI, LiBr, LiCl, LiOH, $LiSO_4$, or any combination thereof.

Embodiment 20. The battery of any one of embodiments 9 to 19, wherein the second lithium salt is a different lithium salt than the first salt and comprises lithium bis(oxalato) borate (LiBOB), lithium bis(pentafluoroethylsulfonyl)imide (Li-BETI), lithium bis(fluorosulfonyl)imide (LiFSI), lithium tetrafluoroborate ($LiBF_4$), lithium trifluoromethanesulfonate (LiTriflate), lithium hexafluoroarsenate ($LiAsF_6$), lithium bis(trifluoromethanesulfonimide) (LiTFSI), and lithium hexafluoro-phosphate ($LiPF_6$), lithium nitrate ($LiNO_3$), $LiN(SO_2CF_3)_2$, $LiN(SO_2F)_2$, $LiCF_3SO_3$, $LiClO_4$, lithium difluoro oxalato borate anion (LiDFOB), LiI, LiBr, LiCl, LiOH, $LiSO_4$, LiFSI, LiTFSI, or any combination thereof.

Embodiment 21. The battery of any one of the preceding embodiments, wherein the battery has a capacity retention of 80 percent at 100 cycles or more.

Embodiment 22. The battery of any one of the preceding embodiments, wherein the battery has a capacity retention of 80 percent at 120 cycles or more.

Embodiment 23. The battery of embodiments 21 or 22, wherein the battery has a capacity of about 180 mAh/g or more.

Embodiment 24. The battery of embodiments 21 or 22, wherein the battery has a capacity of about 200 mAh/g or more.

Embodiment 25. The battery of any one of the preceding embodiments, wherein the diluent comprises a fluorinated ether.

Embodiment 26. The battery of embodiment 25, wherein the fluorinated ether comprises one or more of 1,1,2,2-tetrafluoroethyl 2,2,3,3-tetrafluoropropyl ether; bis(2,2,2-trifluoroethyl) ether, hexafluoroisopropyl methyl ether; 1,1,2,2-tetrafluoroethyl ethyl ether; 1H,1H,5H-octafluoropentyl 1,1,2,2,-tetrafluoroethyl ether; 1,1,2,2-tetrafluoroethyl ether, 1,2-(1,1,2,2,-tetrafluoroethoxy) ethane; 1,3-(1,1,2,2-Tetrafluoroethoxy)propane (TFEP), 1,1,2,3,3,3-hexafluoro propyl 2,2,2-trifluoroethyl ether; n-butyl 1,1,2,2-tetrafluoroethyl ether; 1H,1H,2'H,3H-decafluoro dipropyl ether; 1,1,2,3,3,3-hexafluoropropyl ethyl ether; 1,1,1-trifluoro-2-[1-(2,2,2-trifluoroethoxy)ethoxy] ethane; 1H,1H,2'H-perfluorodipropyl ether, 1,1,2,2-tetrafluoroethyl isobutyl ether; 1,1,1,2,2,3,4,5,5,5-decafluro-2-methoxy-4-(trifluoromethyl)pentane; 1-(ethoxy)nonafluorobutane having a mixture of n- and iso-butyl isomers; 2-(trifluormethyl)-3-ethoxydodecafluorohexane; 3-methoxyperfluoro(2-methylpentane); heptafluoropropyl 1,2,2,2-tetrafluoroethyl ether; 1,1,2,2-tetrafluoroethyl-2,2,2-trifluoroethyl ether; methoxynonafluorobutane; ethoxynonafluorobutane; tris(2,2,2-trifluroethyl)orthoformate; and di(2,2,2-trifluroethyl) carbonate.

Embodiment 27. The battery of any one of embodiments 9 to 26, wherein the solvating solvent comprises dialkoxy alkanes, dialkyl glycol ethers, disubstituted esters, disubstituted carbonates, trisubstituted phosphates, disubstituted sulfones, tetrasubstituted silanes, or any combination thereof.

Embodiment 28. The battery of any one of the preceding embodiments, further comprising a separator that comprises nonwoven fibers, microporous films, ceramics, or any combination thereof.

Embodiment 29. A method of forming an electrolyte comprising, a. dissolving a lithium salt comprised of a first lithium salt and a second lithium salt in a solvating solvent to form a solvating solvent-lithium salt solution,
b. dissolving a diluent in the solvating solvent-lithium salt solution, and
c. further dissolving more of the first lithium salt or the second lithium salt to a concentration that exceeds an amount of the lithium salt soluble in the solvating solvent to form the electrolyte.

Embodiment 30. The method of embodiment 29, wherein the first lithium salt and/or the second lithium salt present in the electrolyte is below the saturation point of the lithium salt in the electrolyte.

Embodiment 31. The method of embodiments 29 or 30, wherein the first and/or second lithium salts have different saturation points in the solvating solvent-lithium solution and electrolyte.

Embodiment 32. An electrolyte comprised of a solvating solvent, diluent, and a lithium salt comprised of a first lithium salt and second lithium salt, the electrolyte being a solution having a saturation point, the solvating solvent having a saturation point and the lithium salt being at least 5 times more soluble in the solvating solvent, wherein the first lithium salt and the second lithium salt are present in an amount below the saturation point of the electrolyte and above the saturation point of the solvating solvent if present in the absence of the diluent.

Embodiment 33. The electrolyte of embodiment 32, wherein the first and/or second lithium salts have different saturation points in the electrolyte and the solvating solvent.

EXAMPLES

The follow examples are intended to be illustrative and do not unduly limit the scope of the disclosure.

Example 1

For Example 1, the battery cells is formed in a high purity Argon filled glove box (M-Braun, $O_2$ and humidity content<0.1 ppm). For the cathode, the disorder rocksalt cathode active material is mixed with polyvinylidene fluoride (PVDF), carbon black powder, and liquid 1-methyl-2-pyrolidinone (NMP) to form a slurry. The resulting slurry is deposited on an aluminum current collector and dried to form a composite cathode film. For the anode, the graphitic carbon is mixed with carboxymethyl cellulose (CMC), styrene-butadiene rubber (SBR), carbon black powder and deionized water to form a slurry. The resulting slurry is deposited on a copper current collector and is dried to form a composite anode film. Each battery cell includes the composite cathode film, a polypropylene separator, and composite anode film. The localized high salt concentration electrolyte is prepared by mol ratio. For example, Lithium bis(fluorosulfonyl)imide (LiFSI), dimethyl carbonate (DMC) and 1,2-(1,1,2,2,-tetrafluoroethoxy) ethane (TFEE) is mixed by 1/1.6/2 mol ratio and added to the battery cell. The battery cell is then sealed and initially cycled at 30° C. using 0.05 C discharge to upper cutoff voltage 4.55V followed by constant voltage hold until the current dropped to 0.02 C and then discharged to 1.5V using 0.05 C constant current. The second cycle is changed to 0.1 C for discharge and disdischarge to complete the formation cycle. In the third cycle, 0.1 C discharge is used for full discharge and 1 C disdischarge is used for rate performance evaluation. After that, the cells were cycled 0.33 C/0.33 cycling performance evaluation.

Figure 1B:
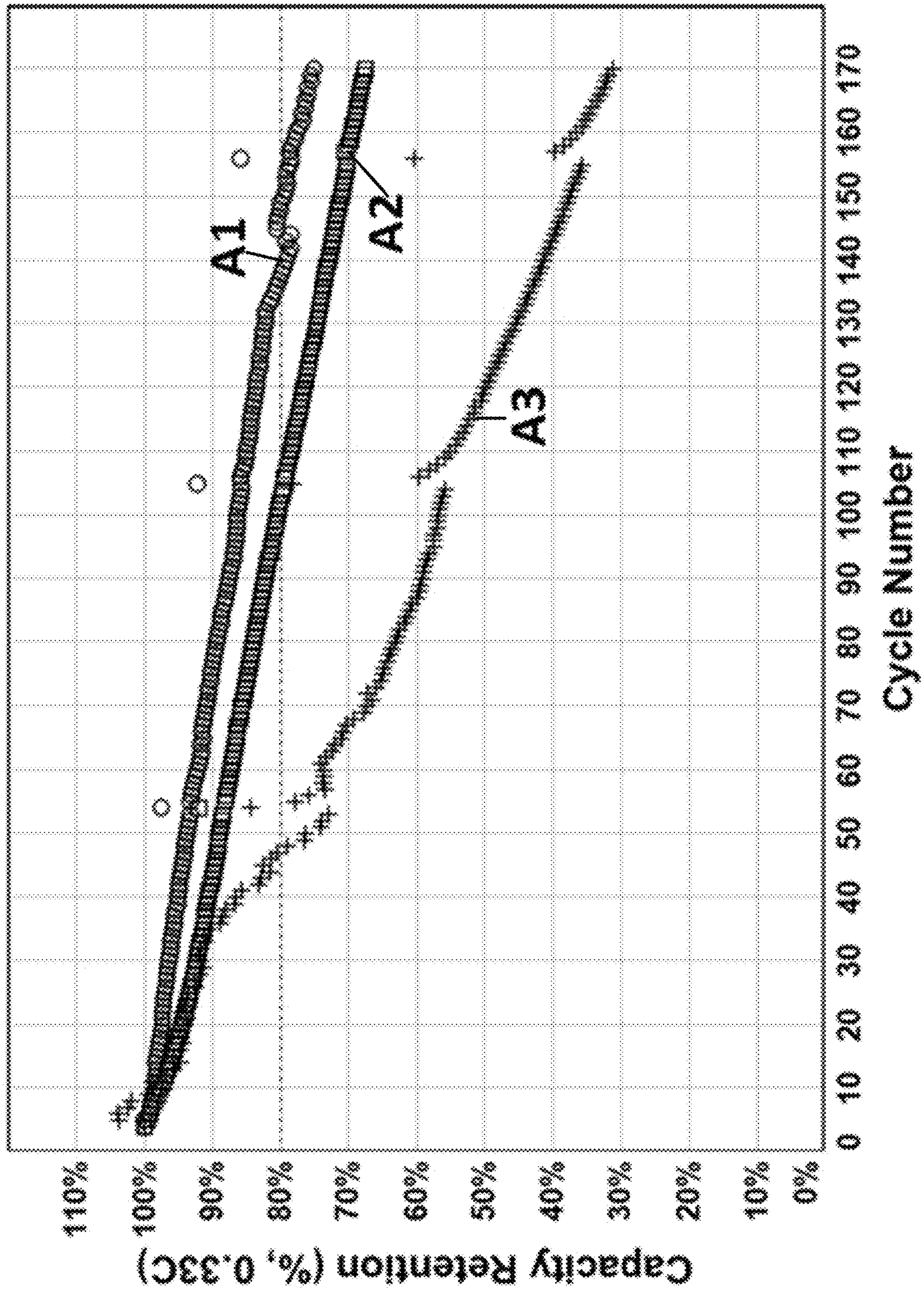

FIG. 1A illustrates the discharge capacity of various solvating solvents used with a disordered rocksalt cathode. FIG. 1B illustrates the and capacity retention of various solvating solvents used with a disordered rocksalt cathode.

TABLE 1

| ELE ID | Electrolyte Name | Cy4 (0.33 C) Cap | Cycle # with 80% CR |
|---|---|---|---|
| Reference | 1M LiPF6 in EC/FEMC = 2/3 by vol + 2% EM1.1 + 2% LiDFOB | 225.9 | 91 |
| A1 | LiFSI/DMC/BTFE = 1/1.5/2 by mol | 207.1 | 149 |
| A2 | LiFSI/DMC/TTE = 1/1.5/2 by mol | 233.8 | 102 |
| A3 | LiFSI/DME/TTE = 1/1.2/3 by mol | 148.3 | 47 |

Table 1 illustrates the discharge capacity and capacity retention of different solvating solvents and diluents from FIGS. 1A-1B. Both dimethoxy ethane (DME) and dimethyl carbonate (DMC) are evaluated as the solvating solvent, shown in FIGS. 1A-1B. A conventional electrolyte (i.e., reference) with low concentration of LiPF6 salt and an additive package of tris(trimethylsilyl) phosphate+LiDFOB) is reaching 80% of the initial discharge capacity at 91 cycles. The localized high concentration electrolyte with DME (A3: LiFSI/DME/TTE=1/1.2/3 by mol) is not performing as well with the DR cathode and the graphite anode as the DMC. The localized high concentration electrolyte with DMC as the solvating solvent is showing desirable results when paired with the disordered rocksalt cathode and graphite anode. Using TTE (A2) as the diluting solvent shows better performance than BTFE (A1) when paired with DMC, which cycles 149 times before reaching 80% of the initial discharge capacity.

Example 2

For Example 2, the battery is set up in the same way as Example 1, except that salts are changed.

Figure 2A:
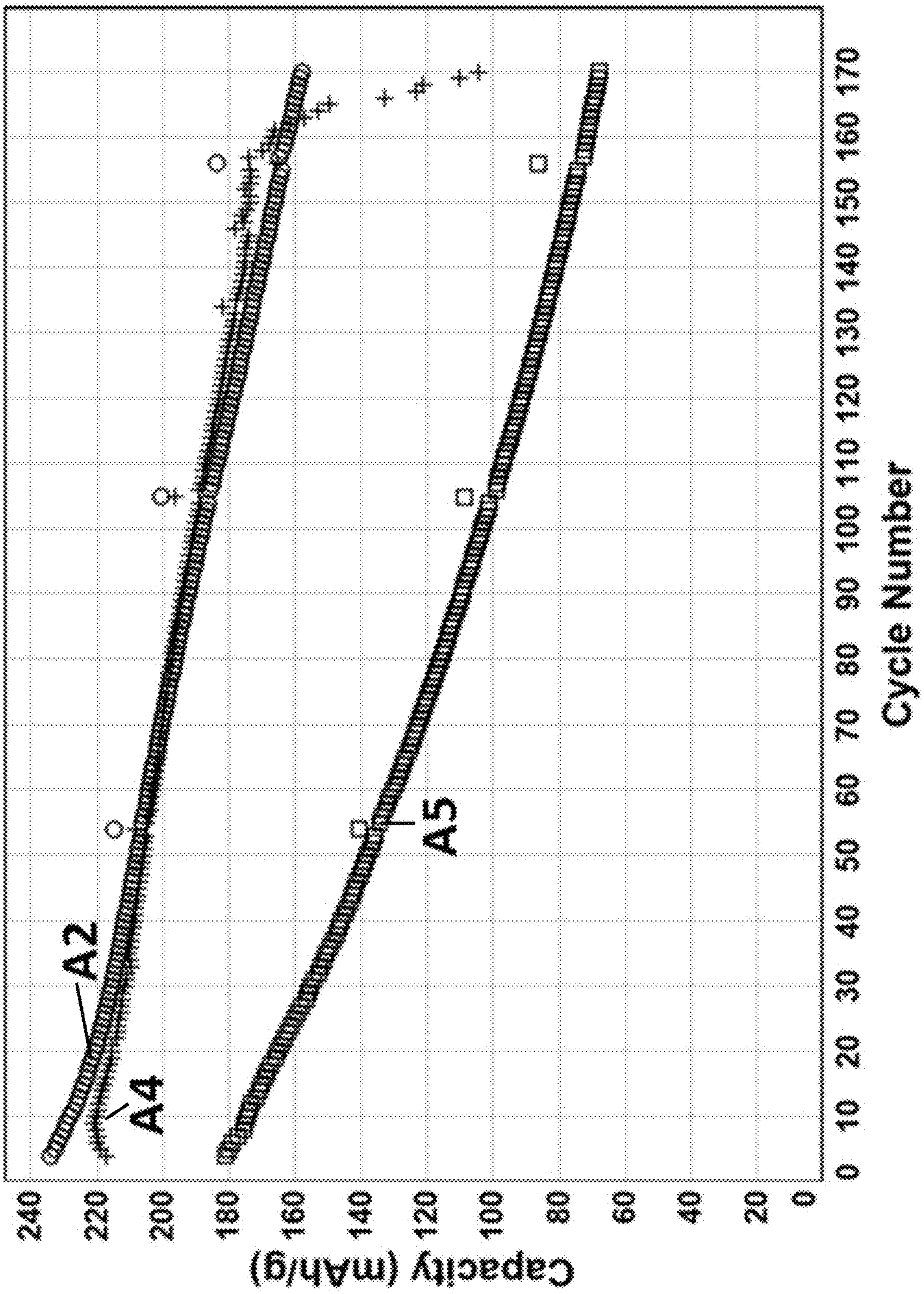
FIGS. 2A-2B illustrates the discharge capacity and capacity retention of a single lithium salt compared to a dual lithium salt electrolyte.
Figure 2B:
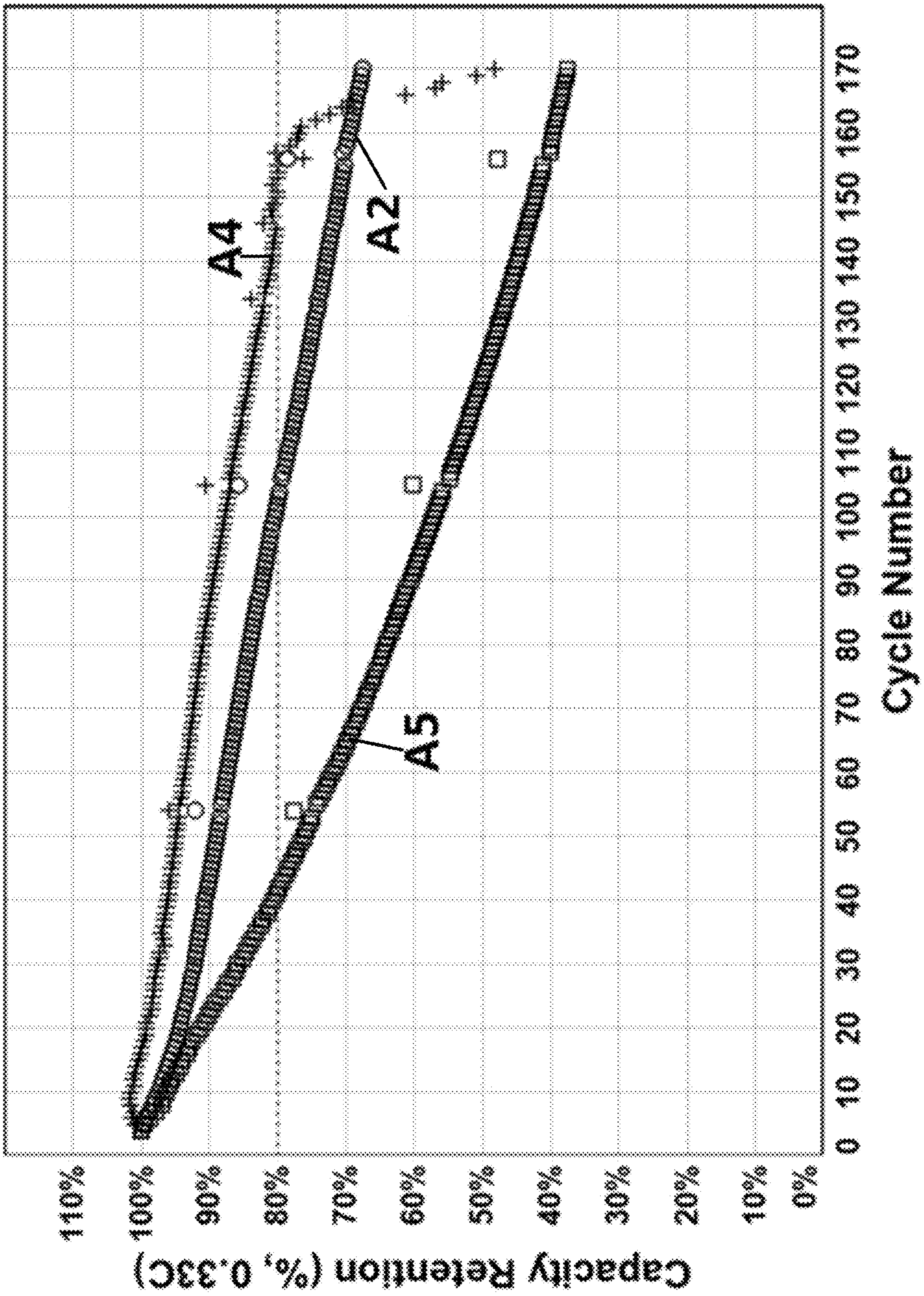

FIGS. 2A-2B illustrate the discharge capacity and capacity retention of one lithium salt compared to a dual lithium salt electrolyte.

TABLE 2

| ELE ID | Electrolyte Name | Cy4 (0.33 C) Cap | Cycle # with 80% CR |
|---|---|---|---|
| Reference | 1M LiPF6 in EC/FEMC = 2/3 by vol + 2% EM1.1 + 2% LiDFOB | 225.9 | 91 |
| A2 | LiFSI/DMC/TTE = 1/1.5/2 by mol | 233.8 | 102 |
| A4 | LiFSI/LiBF4/DMC/TTE = 0.75/0.25/1.5/2 by mol | 216.9 | 157 |
| A5 | LiFSI-LiPF6-DMC-BTFE = 0.75/0.25/1.5/2 by mol | 181.0 | 41 |

Table 2 illustrates the results of FIGS. 2A-2B. Using the DMC/TTE solvating/diluting solvent combination, combinations of salts are evaluated in the localized high concentration electrolyte with DR cathode and graphite anode in combination. The formulation containing $LiBF_4$ and LiFSI (A4) performs best.

Example 3

For Example 3, the battery and electrolyte are set up the same as Example 1 except that a different formulation of the electrolyte is used.

Figure 3A:
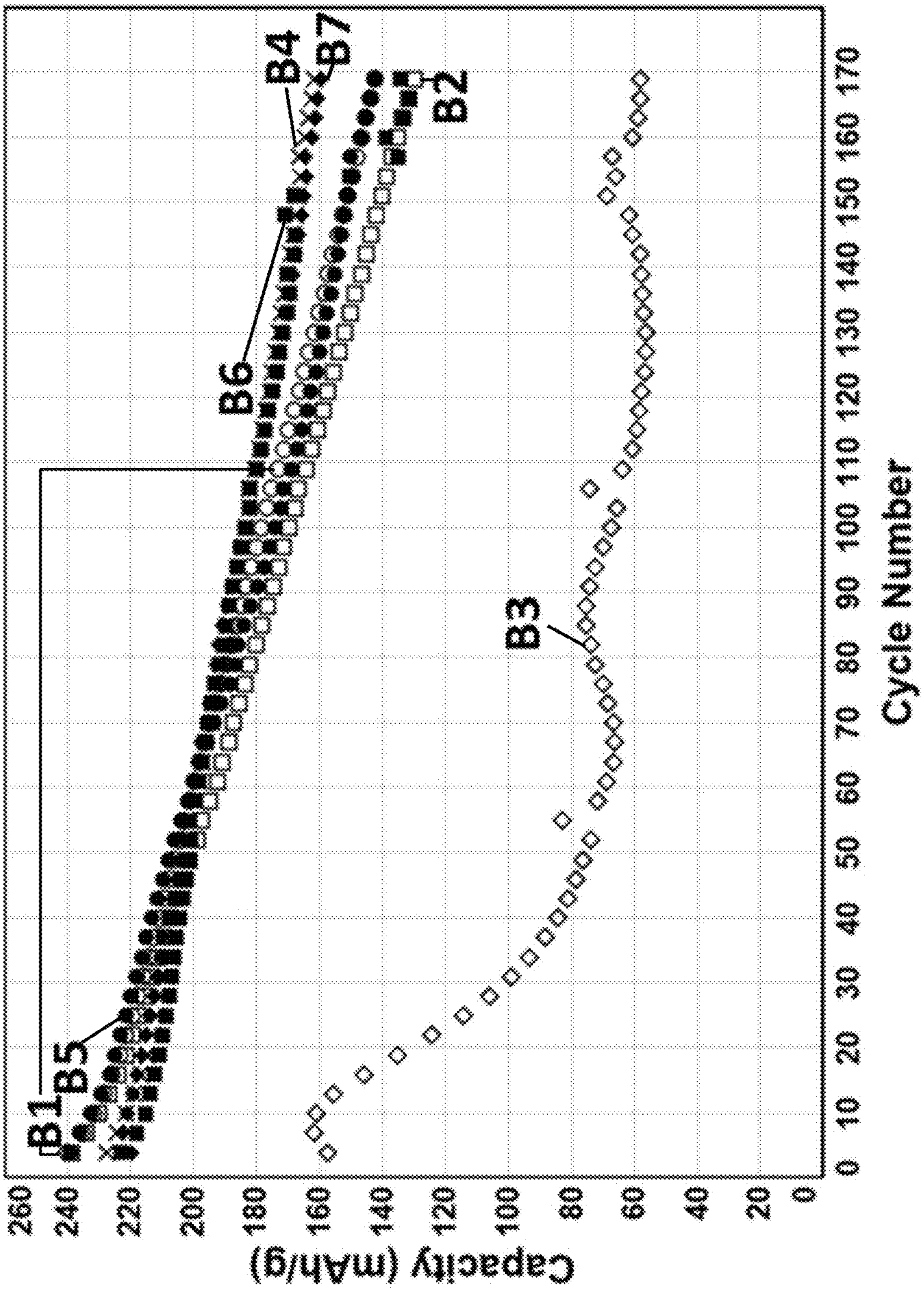
FIGS. 3A-3B illustrates the discharge capacity and capacity retention of various diluents used with the disordered rocksalt cathode.
Figure 3B:
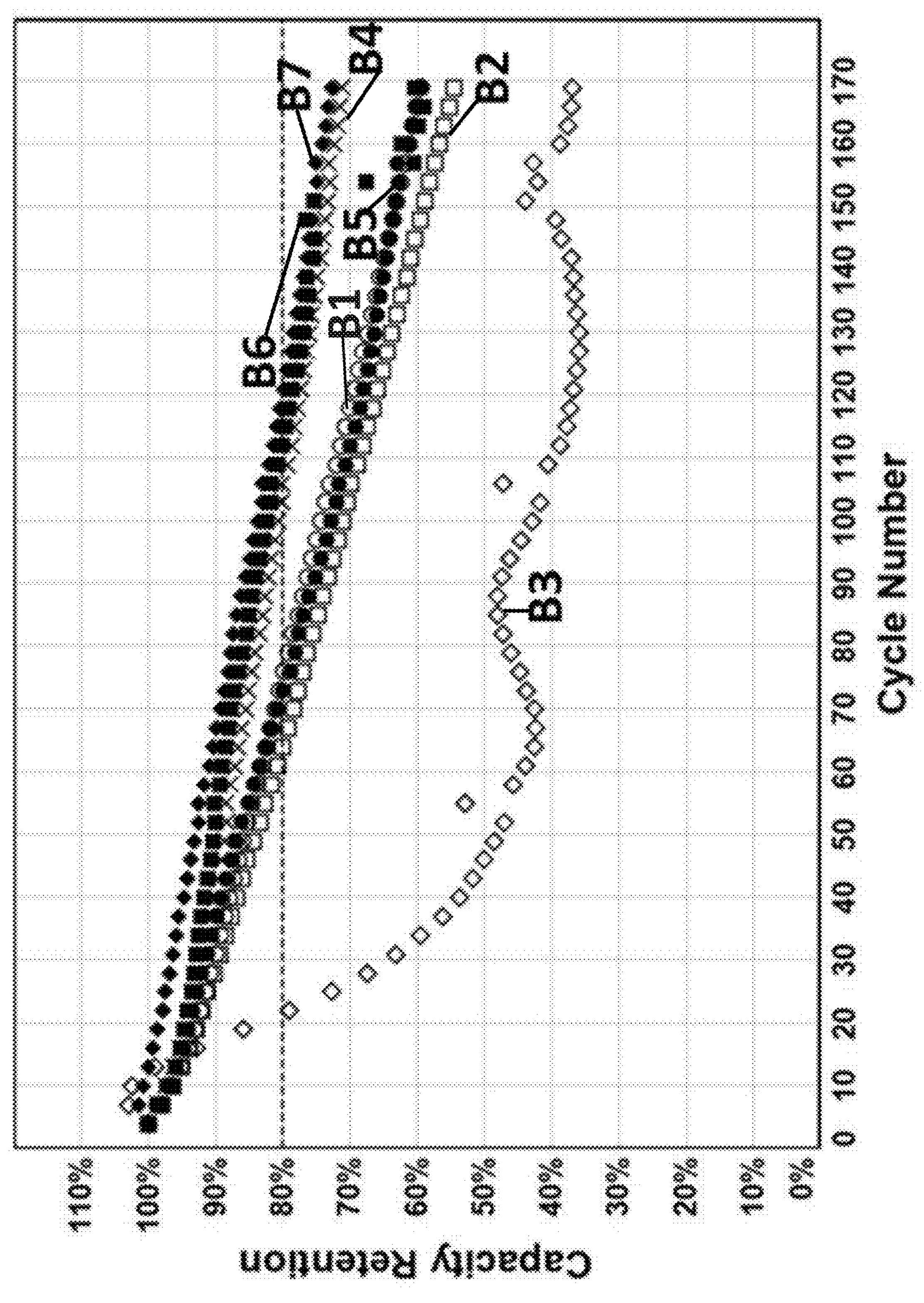

FIGS. 3A-3B illustrate the discharge capacity and capacity retention of various diluents used with the disordered rocksalt cathode.

TABLE 3

| ELE ID | Electrolyte Name | Cy4 (0.33 C) Cap | Cycle # with 80% CR |
|---|---|---|---|
| B1 | LiFSI/DMC/hexafluoroisopropyl methyl ether (HFPME) = 1/1.6/3 | 240.0 | 75 |
| B2 | LiFSI/DMC/1,1,2,2-tetrafluoroethyl ethyl ether (TFEEE) = 1/1.6/3 | 238.6 | 64 |
| B3 | LiFSI/DMC/1H,1H,5H-Octafluoropentyl 1,1,2,2-Tetrafluoroethyl Ether (OFPTFEE) = 1/1.6/3 | 157.2 | 21 |
| B4 | LiFSI/DMC/1,2-(1,1,2,2-Tetrafluoroethoxy)Ethane (TFEE) = 1/1.6/3 | 227.5 | 106 |
| B5 | LiFSI/DMC/1,1,2,3,3,3-Hexafluoro propyl 2,2,2trifluoroethyl ether (HFPTFEE) = 1/1.6/3 | 239.1 | 73 |
| B6 | LiFSI/DMC/bis(2,2,2-trifluoroethyl) ether (BTFE) = 1/1.6/3 | 222.9 | 112 |
| B7 | LiFSI/DMC/1,1,2,2-tetrafluoroethyl-2,2,3,3-tetrafluoropropyl ether (TTE) = 1/1.6/3 | 219.5 | 119 |

The diluents of the localized high concentration electrolyte include HFPME, TFEEE, OFPTFEE, TFEE, HFPTEE, BTFE, and TTE. The results are highlighted in table 3.

As seen from Table 3, TFEE, TTE and BTFE of the localized high concentration electrolyte performed similarly or better compared to the conventional electrolyte of FIGS. 1A-1B (reference).

What is claimed is:

1. A battery, comprising:

a cathode comprising a disordered rocksalt structure; and an electrolyte, comprising:

a solvating solvent;

a lithium salt soluble in the solvating solvent; and a diluent, wherein the diluent and solvating solvent are immiscible at a molar ratio of diluent/solvating solvent of 2 to 10, the lithium salt being at least 5 times more soluble in the solvating solvent than in the diluent, and the solvating solvent and the diluent being present in the battery at a diluent/solvating solvent molar ratio of 0.1 to less than 3.0.

2. The battery of claim 1, wherein the diluent has a miscibility point in the solvating solvent and the lithium salt has a saturation point in the solvating solvent such that the saturation point of the lithium salt in the solvating solvent is at least 5 times greater than the miscibility point of the diluent in the solvating solvent.

3. The battery of claim 1, wherein the diluent and the solvating solvent are immiscible at a molar ratio of diluent/solvating solvent of 2 to 5.

4. The battery of claim 1, wherein the diluent and the solvating solvent are present in a molar ratio of 1.0 to 3.0.

5. The battery of claim 1, wherein the lithium salt and combination of the solvating solvent and the diluent are present in a molar ratio 1:2 or more.

6. The battery of claim 1, wherein the lithium salt is present at a concentration of about 0.5 M or more, at a saturation point within the solvating solvent or within the solvating solvent and diluent.

7. The battery of claim 1, wherein the solvating solvent comprises one or more of dialkoxy alkanes, dialkyl glycol ethers, disubstituted esters, disubstituted carbonates, trisubstituted phosphates, disubstituted sulfones, and tetrasubstituted silanes.

8. The battery of claim 7, wherein the solvating solvent comprises the disubstituted carbonates.

9. The battery of claim 1, further comprising an anode that comprises one or more of graphite, lithium, lithium alloy, silicon, and a silicon alloy.

10. The battery of claim 1, wherein the battery has a capacity retention of 80 percent at 100 cycles or more.

11. The battery of claim 1, wherein the diluent is present in an amount in the electrolyte that is below but within 50% of the molar ratio where the diluent is immiscible in the solvating solvent.

12. The battery of claim 11, wherein the amount of diluent present in the electrolyte is within 20% of the molar ratio where the diluent is immiscible in the solvating solvent.

13. The battery of claim 11, wherein the lithium salt is less than 10 times more soluble in the solvating solvent than in the diluent.

14. The battery of claim 1, wherein the diluent comprises a fluorinated ether.

15. The battery of claim 14, wherein the fluorinated ether comprises one or more of 1,1,2,2-tetrafluoroethyl 2,2,3,3-tetrafluoropropyl ether; bis(2,2,2-trifluoroethyl) ether, hexafluoroisopropyl methyl ether; 1,1,2,2-tetrafluoroethyl ethyl ether; 1H,1H,5H-octafluoropentyl 1,1,2,2,-tetrafluoroethyl ether; 1,1,2,2-tetrafluoroethyl ether, 1,2-(1,1,2,2,-tetrafluoroethoxy) ethane; 1,3-(1,1,2,2-Tetrafluoroethoxy) propane (TFEP), 1,1,2,3,3,3-hexafluoro propyl 2,2,2-trifluoroethyl ether; n-butyl 1,1,2,2-tetrafluoroethyl ether; 1H,1H,2'H,3H-decafluoro dipropyl ether; 1,1,2,3,3,3-hexafluoropropyl ethyl ether; 1,1,1-trifluoro-2-[1-(2,2,2-trifluoroethoxy) ethoxy] ethane; 1H,1H,2'H-perfluorodipropyl ether, 1,1,2,2-tetrafluoroethyl isobutyl ether; 1,1,1,2,2,3,4,5,5,5-decafluro-2-methoxy-4-(trifluoromethyl) pentane; 1-(ethoxy) nonafluorobutane having a mixture of n- and iso-butyl isomers; 2-(trifluormethyl)-3-ethoxydodecafluorohexane; 3-methoxyperfluoro (2-methylpentane); heptafluoropropyl 1,2,2,2-tetrafluoroethyl ether; 1,1,2,2-tetrafluoroethyl-2,2,2-trifluoroethyl ether; methoxynonafluorobutane; ethoxynonafluorobutane; tris (2,2,2-trifluroethyl) orthoformate; and di (2,2,2-trifluroethyl) carbonate.

16. The battery of claim 1, further comprising a separator that comprises nonwoven fibers, microporous films, ceramics, or any combination thereof.

17. An electrolyte comprised of a solvating solvent, diluent, and a lithium salt comprised of a first lithium salt and a second lithium salt, the electrolyte being a solution having a saturation point, the solvating solvent having a saturation point, and the lithium salt being at least 5 times more soluble in the solvating solvent than in the diluent, wherein the first and second lithium salts are present in an amount below the saturation point of the electrolyte and above the saturation point of the solvating solvent.

18. The electrolyte of claim 17, wherein the first lithium salt and the second lithium salt each have a different saturation point in the electrolyte and the solvating solvent.

* * * * *